(12) United States Patent
Qi (10) Patent No.: US 10,585,645 B2
(45) Date of Patent: Mar. 10, 2020

(54) QUANTUM RANDOM NUMBER GENERATOR

(71) Applicant: UT-Battelle, LLC, Oak Ridge, TN (US)

(72) Inventor: Bing Qi, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 16/057,345

(22) Filed: Aug. 7, 2018

(65) Prior Publication Data

US 2019/0050203 A1     Feb. 14, 2019

Related U.S. Application Data

(60) Provisional application No. 62/544,325, filed on Aug. 11, 2017.

(51) Int. Cl.

| G06F 7/58 | (2006.01) |
|---|---|
| H04L 9/08 | (2006.01) |
| H04L 9/06 | (2006.01) |
| G06N 10/00 | (2019.01) |

(52) U.S. Cl.
CPC ............ *G06F 7/588* (2013.01); *H04L 9/0662* (2013.01); *H04L 9/0852* (2013.01); *G06N 10/00* (2019.01)

(58) Field of Classification Search
CPC ............ G06F 7/58; G06F 7/588; G06N 10/00
USPC ........................................ 708/250, 251, 255
See application file for complete search history.

(56) References Cited

U.S. PATENT DOCUMENTS

| 7,284,024 | B1 | 10/2007 | Trifonov et al. | |
|---|---|---|---|---|
| 8,554,814 | B2 | 10/2013 | Qi et al. | |
| 2013/0036145 | A1* | 2/2013 | Pruneri | G06F 7/588 |
| | | | | 708/191 |
| 2019/0220250 | A1* | 7/2019 | Shi | G06F 7/58 |
| 2019/0258458 | A1* | 8/2019 | Walmsley | G06F 7/588 |

OTHER PUBLICATIONS

T. Gehring, et al., Implementation of continuous-variable quantum key distribution with composable and one-sided-device-independent security against coherent attacks, Nature Communications, 6:8795, DOW:10.1038, 2015 (Year: 2015).*
Qi, B., "True randomness from an incoherent source", Review of Scientific Instruments 88, 113101-1 (2017).
Qi, B., "Genuine randomness from an incoherent source", downloaded at https://arxiv.org/pdf/1611.00224v1.pdf, dated Nov. 1, 2016.
Ma, X. et al., "Quantum random number generation", npj Quantum Inf. 2, 16021 (2016).
Herrero-Collantes, M. et al., "Quantum Random Number Generators", downloaded at https://arxiv.org/pdf/1604.03304.pdf, dated Oct. 21, 2016.
Hensen, B. et al., "Closing the loopholes on Bell's theorem", Nature 526, 682 (2015).

(Continued)

*Primary Examiner* — Andrew Caldwell
*Assistant Examiner* — Emily E Larocque
(74) *Attorney, Agent, or Firm* — Warner Norcross + Judd LLP (57) ABSTRACT

A system and method according to one embodiment are provided for random number generation based on measuring quadrature fluctuations of a single mode thermal state using an optical homodyne detector.

20 Claims, 5 Drawing Sheets

(56) References Cited

OTHER PUBLICATIONS

Jennewein, T. et al., "A Fast and Compact Quantum Random Number Generator", Rev. Sci. Instrum. 71, 1675 (2000).

Stefanov, A. et al., "Optical quantum random number generator", J. Mod. Opt. 47, 595 (2000).

Ma, X. et al., "Postprocessing for quantum random-number generators: entropy evaluation and randomness extraction", Phys. Rev. A 87, 062327 (2013).

Frauchiger, D. et al., "True randomness from realistic quantum devices", downloaded at https://arxiv.org/pdf/1311.4547.pdf, dated Nov. 18, 2013.

Lougovski, P. et al., "An Observed-Data-Consistent Approach to the Assignment of Bit Values in a Quantum Random Number Generator", downloaded at https://arxiv.org/pdf/1404.5977.pdf, dated Apr. 23, 2014.

Haw, J. Y. et al., "Maximization of Extractable Randomness in a Quantum Random-Number Generator", Phys. Rev. Applied 3, 054004 (2015).

Xu, F. et al., "Ultrafast quantum random number generation based on quantum phase fluctuations", Opt. Express 20, 12355 (2012).

Abellan, C. et al., "Ultra-fast quantom randomness generation by accelerated phase diffusion in a pulsed laser diode", Opt. Express 22, 1645 (2014).

Mitchell, M. W. et al., "Strong experimental guarantees in ultrafast quantum random number generation", Phys. Rev. A 91, 012314 (2015).

Nie, Y. Q. et al., "Gbps quantum random number generation by measuring laser phase fluctuations", Rev. Sci. Instrum. 86, 063105 (2015).

Khanmohammadi, A. et al., "A Monolithic Silicon Quantum Random Number Generator Based on Measurement of Photon Detection Time", IEEE Photonics Journal, vol. 7, No. 5, Oct. 2015.

Abellan, C. et al., "Quantum entropy source on an InP photonic integrated circuit for random number generation", Optica, vol. 3, No. 9, dated Sep. 8, 2016.

Gabriel, C. et al., "A generator for unique quantum random numbers based on vacuum states", Nat. Photonics 4, 711 (2010).

Shen, Y. et al., "A practical quantum random number generator based on measuring the shot noise of vacuum states", Phys. Rev. A 81, 063814 (2010).

Symul, T. et al., "Real time demonstration of high bitrate quantum random number generation with coherent laser light", Appl. Phys. Lett. 98, 231103 (2011).

Qi, B. et al., "High-speed quantum random number generation by measuring phase noise of a single-mode laser", Optics Letters, vol. 35, No. 3, dated Feb. 1, 2010.

Guo, H. et al, "Truly random number generation based on measurement of phase noise of a laser", Phys. Rev. E 81, 051137 (2010.

Jofre, M. et al., "True random numbers from amplified quantum vacuum", Opt. Express 19, 20665 (2011).

Yuan, Z. L. et al., "Robust random number generation using steady-state emission of gain-switched laser diodes", Appl. Phys. Lett. 104, 261112 (2014).

Abellan, C. et al., "Generation of fresh and pure random numbers for loophole-free Bell tests", Phys. Rev. Lett. 115, 250403 (2015).

Williams, C. R. et al., "Fast physical random number generator using amplified spontaneous emission", Opt. Express 18, 23584 (2010).

Li, X. et al., "Scalable parallel physical random number generator based on a superluminescent LED", Opt. Lett. 36, 020, Mar. 15, 2011.

Yuan, X. et al., "Intrinsic randomness as a measure of quantum coherence", Phys. Rev. A 92, 022124 (2015).

Zhou, Q. et al., "Practical quantum random number generator based on sampling vacuum fluctuations", downloaded at https://arxiv.org/pdf/1703.00559.pdf, dated Mar. 2, 2017.

Schmidt, H., "Quantum-Mechanical Random-Number Generator", J. Appl. Phys. 41, 462 (1970).

Fiorentino, M. et al., "Secure self-calibrating quantum random-bit generator", Phys. Reev. A 75, 032334 (2007).

Cao, Z. et al., "Source-independent quantum random number generation", Phys. Rev. X 6, 010020 (2016).

Zhang, X. G. et al., "Fully integrated 3.2 Gbps quantum random number generator with real-time extraction", Rev. Sci. Instrum. 87, 076102 (2016).

\* cited by examiner

The NIST statistical test results of $10^9$ random bits.

Results for the uniformity of P-values and the proportion of passing sequences

| C1 | C2 | C3 | C4 | C5 | C6 | C7 | C8 | C9 | C10 | P-value | Proportion | Statistical test |
|---|---|---|---|---|---|---|---|---|---|---|---|---|
| 107 | 99 | 83 | 102 | 89 | 100 | 99 | 116 | 100 | 104 | 0.633 955 | 992/1000 | Frequency |
| 102 | 78 | 85 | 106 | 94 | 108 | 93 | 113 | 100 | 121 | 0.088 762 | 993/1000 | Block frequency |
| 110 | 101 | 91 | 99 | 98 | 89 | 96 | 95 | 110 | 111 | 0.769 527 | 994/1000 | Cumulative sums |
| 98 | 91 | 98 | 98 | 94 | 115 | 91 | 116 | 104 | 95 | 0.603 841 | 993/1000 | Runs |
| 96 | 104 | 95 | 115 | 102 | 101 | 80 | 111 | 93 | 93 | 0.314 544 | 990/1000 | Longest run |
| 111 | 86 | 77 | 107 | 123 | 88 | 109 | 108 | 97 | 103 | 0.057 146 | 991/1000 | Rank |
| 93 | 102 | 118 | 96 | 105 | 95 | 101 | 103 | 94 | 93 | 0.800 005 | 985/1000 | FFT |
| 104 | 93 | 96 | 91 | 102 | 102 | 95 | 107 | 99 | 111 | 0.933 333 | 982/1000 | NonOverlapping template |
| 98 | 105 | 97 | 108 | 94 | 86 | 100 | 92 | 119 | 101 | 0.574 903 | 990/1000 | Overlapping template |
| 94 | 103 | 112 | 94 | 107 | 93 | 102 | 101 | 101 | 93 | 0.948 298 | 989/1000 | Universal |
| 95 | 97 | 114 | 81 | 101 | 98 | 112 | 97 | 111 | 94 | 0.431 754 | 995/1000 | Approximate entropy |
| 67 | 51 | 62 | 69 | 76 | 63 | 63 | 62 | 64 | 53 | 0.592 591 | 614/630 | Random excursions |
| 53 | 46 | 65 | 63 | 52 | 72 | 67 | 68 | 57 | 89 | 0.012 031 | 621/630 | Random excursions variant |
| 117 | 90 | 118 | 115 | 75 | 101 | 91 | 93 | 104 | 96 | 0.044 797 | 991/1000 | Serial |
| 97 | 92 | 91 | 88 | 104 | 106 | 120 | 88 | 96 | 118 | 0.194 813 | 986/1000 | Linear complexity |

Fig. 5

QUANTUM RANDOM NUMBER GENERATOR

CROSS-REFERENCE TO RELATED APPLICATION

This application claims the benefit of U.S. Provisional Application 62/544,325, filed Aug. 11, 2017, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present disclosure relates to the field of random number generation, and more specifically to the generation of random numbers based on quantum mechanics.

BACKGROUND

Truly random numbers are required in many branches of science and technology, from fundamental research in quantum mechanics to practical applications such as cryptography. While a pseudorandom number generator can expand a short random seed into a long train of apparent "random" bits using deterministic algorithms, the entropy of generated random numbers is still bounded by the original short random seed. To generate true randomness, researchers have been exploring various physical processes.

Quantum random number generation is an emerging technology, which can provide high-quality random numbers with proven randomness. Different from physical random number generators exploring chaotic behaviors of classical systems, a quantum random number generator (QRNG) harnesses the truly probabilistic nature of fundamental quantum processes.

In general, a conventional process of random number generation can be divided into two steps: the measurement step and the randomness extraction step. Conventionally, in the first step, attempts may be made to perform a measurement on an entropy source. In practice, both the source and the detection system are not perfect and will introduce technical noises in addition to any quantum noise. In the worst-case scenario, the technical noises could be accessible to (or even controlled by) a malicious adversary (Eve) and thus cannot be trusted. Furthermore, the raw output of the detector may not be uniformly distributed. The second step of the conventional process for random number generation is to perform randomness extraction. However, in practice, randomness extraction may be ineffective because the quantum noise is not dominant over the technical noises.

Among various QRNG implementations, schemes based on photonic technology have drawn a lot of attention for high rates, low cost, and the potential of chip-size integration. Both conventional single photon detectors and conventional optical homodyne detectors have been employed in photonic QRNGs. Conventional optical homodyne detectors provide highly efficient photo-diodes working at room temperature but are limited to exploring vacuum fluctuation and laser phase noise.

Nevertheless, there are still practical challenges in these conventional systems. In a QRNG based on vacuum noise, one major source of technical noises is the electrical noise of the homodyne detector. For instance, the electrical noise often interferes with measurement of the shot noise. This issue is considered to limit the operating speed of this type of QRNG. In a QRNG based on laser phase noise, fiber interferometers with large arm imbalance (on the order of nanoseconds) are often employed. To achieve high random number generation rates, either phase stabilization of the fiber interferometer or highspeed modulation of the laser source is utilized. In a more recent chip-size design, instead of using a cumbersome fiber interferometer, the outputs from two independent distributed feedback (DFB) lasers are mixed at a beam splitter. Random numbers are generated by operating one laser in a gain switching (GS) mode, while the other laser is in a continuous wave (CW) mode. Essentially, the laser in the GS mode provides a train of phase randomized laser pulses, while the laser in CW mode acts as a phase reference in coherent detection. To achieve a high interference visibility in this conventional system, sophisticated temperature control is utilized to match and stabilize the wavelengths of the two lasers.

SUMMARY

A system and method according to one embodiment are provided for a random number generation scheme based on measuring quadrature fluctuations of a single mode thermal state using an optical homodyne detector. This scheme is implemented by beating a broadband amplified spontaneous emission (ASE) source with a single mode coherent state local oscillator (LO) at a symmetric beam splitter and performing differential photo-detection. The system and method may not require a fiber interferometer of large arm imbalance, which makes it adaptable for chip-size integration. Furthermore, both the ASE source and the LO may be operated in the continuous wave (CW) mode. That is, in CW mode, in one embodiment, no active intensity modulation or phase (and polarization) control may be utilized.

In one embodiment, a random number generator (RNG) operable to generate one or more random bits of data is provided. The RNG may include a quantum noise source configured to generate a thermal state input, and a local oscillator configured to generate a substantially single mode coherent state input. The RNG may include a combiner operably coupled to the quantum noise source and the local oscillator to respectively receive the thermal state input and the substantially single mode input. The combiner may be configured to generate a combined output based on superposition of the thermal state input and the substantially coherent state input.

The RNG may include a detector operable to receive the combined output from the combiner, and to generate an electrical signal indicative of quantum noise of the thermal state input.

In one embodiment, a method of generating one or more random bits of data is provided. The method may include transmitting a thermal state input having quantum noise and transmitting a substantially coherent state input having a narrow spectral bandwidth. The thermal state input may be combined with the substantially coherent state input via superposition to generate outputs from a selected mode of the thermal state input. The method may include generating an electrical signal indicative of the quantum noise in the selected mode of the thermal state input.

In one embodiment, a quantum random number generator (QRNG) is provided with a thermal state generator configured to generate a multi-mode thermal state input. The QRNG may include a detector operably coupled to said thermal state generator and configured to transform the multi-mode thermal state input to a single-mode thermal state input. The detector may be configured to generate an electrical signal based on an electric field component of the single-mode thermal state input, where the electrical signal is indicative of quantum noise in the single-mode thermal state input.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

As stated above, a system and method according to one embodiment are provided for a random number generation scheme based on measuring quadrature fluctuations of a single mode thermal state using an optical homodyne detector. This scheme may be implemented by beating a broadband amplified spontaneous emission (ASE) source with a single mode coherent state local oscillator (LO) at a symmetric beam splitter and performing differential photodetection. The system and method may not require a fiber interferometer of large arm imbalance, which makes it adaptable for chip-size integration. Furthermore, both the ASE source and the LO may be operated in the continuous wave (CW) mode. That is, in CW mode, in one embodiment, no active intensity modulation or phase (and polarization) control may be utilized.

In one embodiment, a high-quality photonic entropy source may be utilized for random number generation. The output of a broadband incoherent source may be mixed with a single mode coherent state LO at a beam combiner (e.g., beam splitter) and differential photodetection may be performed. The quadrature fluctuations of a single mode thermal state can be explored to generate true randomness. In one configuration, a quadrature variance about three orders of magnitude larger than the vacuum noise is achieved, providing tolerance for much higher technical noises in comparison with conventional QRNGs based on measuring the vacuum noise.

In one embodiment, by applying Toeplitz-hashing extractor on the Gaussian distributed raw data of the detector, unbiased random bits may be generated with an efficiency of 5.12 bits per sample.

It is noted that even though the output of the ASE source may be broadband, the optical homodyne detector may selectively detect photons in the same spatial-temporal (and polarization) mode as the LO. The intrinsic "filtering" function of the LO may enable performance of a single mode measurement without actually preparing a single mode thermal state, which may greatly simplify the system over conventional systems. Because the bandwidth of the ASE source is tens of nanometers, it may take little effort to align the central wavelength of the LO within the spectral range of the ASE source.

One embodiment according the present disclosure provides coherent detection to measure quadrature fluctuations instead of direct detection to measure the ASE-ASE beat noises. In comparison with a conventional QRNG based on measuring the vacuum noise, this embodiment may tolerate much higher detector noises. This is primarily because the quadrature variance of a single mode thermal state with an average photon number of n is 2n+1 times as large as that of vacuum noise. By preparing a thermal state with a large average photon number, one embodiment of the present disclosure can effectively increase the quantum noise-to-detector noise ratio.

In one embodiment, true randomness may be generated from an incoherent source despite the intrinsic randomness being deeply connected to quantum coherence. While truly quantum randomness can only originate from a superposition (pure) state, the input state ρ to a measurement device in one embodiment does not have to be pure so long as the system entangled with ρ cannot be accessed by Eve. One illustrative example is a QRNG based on radioactivity, where electrons from a radioactive source, such as $^{90}$Sr, are registered by a Geiger-Mueller tube at random times. In this case, at the time right before the measurement, the joint state of the radioactive nuclei and the electron can be described by the following:

$$|\psi\rangle = \alpha |U\rangle_n |0\rangle_e + \beta |D\rangle_n |1\rangle_e \quad (1)$$

where $|U\rangle_n$ ($|D\rangle_n$) represents undecayed (decayed) nuclei, $|0\rangle_e$ ($|1\rangle_e$) represents 0 (1) electron emitted, respectively, and α and β are normalization coefficients.

While the state $|\psi\rangle$ in (1) is pure, the state accessible to the Geiger-Mueller tube (the measurement device) is a mixed state given by $\rho_e = \alpha^2 |0\rangle\langle 0| + \beta^2 |1\rangle\langle 1|$. To generate secure random numbers, one underlying assumption is Eve cannot access (or control) the radioactive source (otherwise, Eve may acquire a copy of the random bit by measuring the quantum state of the source). A similar consideration can be applied to a QRNG in one embodiment of the present disclosure based on laser phase noise or amplified spontaneous emission, where the emitted photons accessible to the detector are entangled with atoms in the light source. One embodiment of the present disclosure is based on this "trusted" device scenario. Note that this trusted device scenario may be different from the assumptions adopted in a so-called source-independent QRNG, where the state input to the detector may be entangled with the environment accessible to Eve, which therefore is considered untrustworthy.

Figure 1:
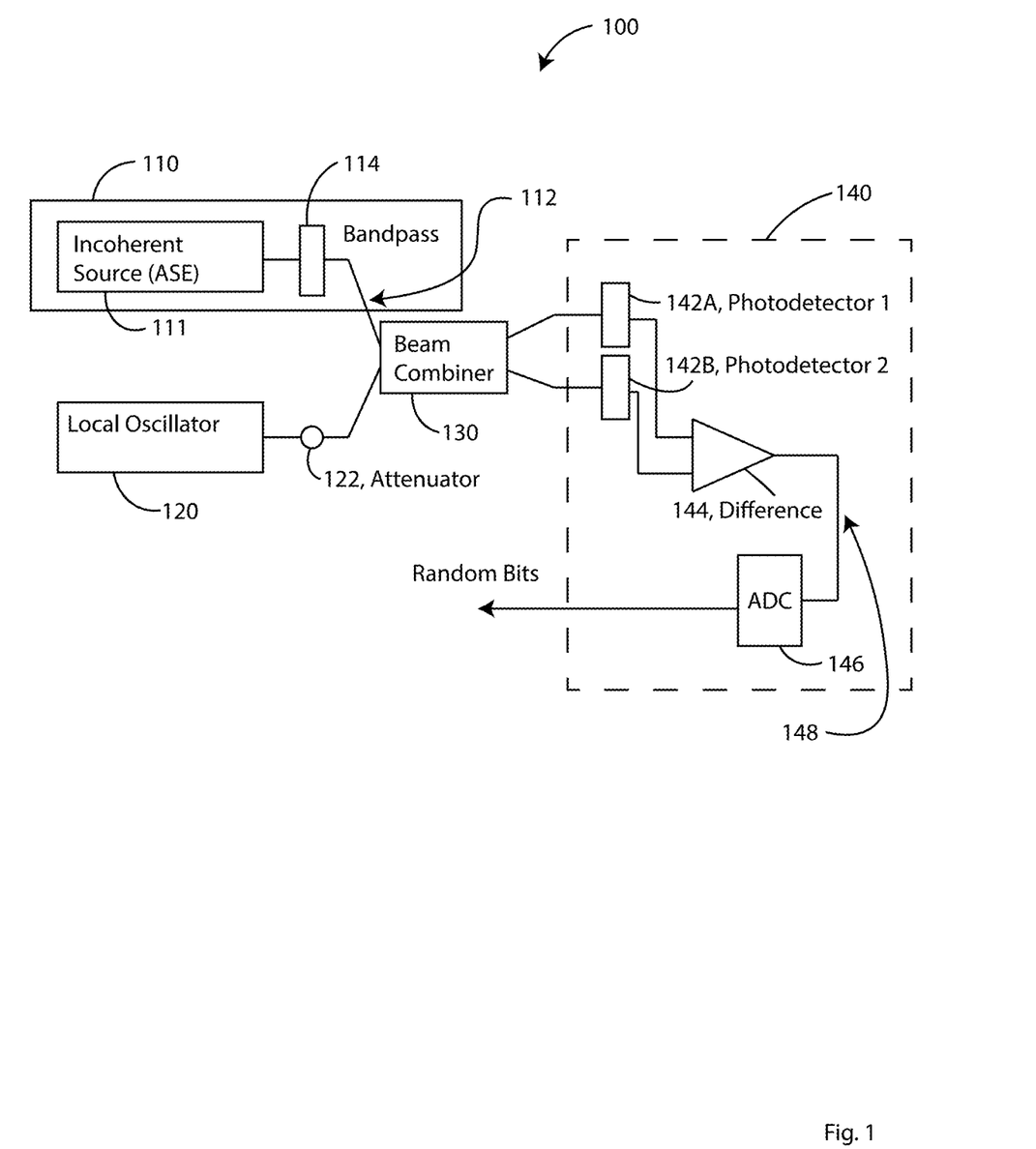
FIG. 1 shows a random number generator according to one embodiment of the present disclosure.

A RNG system in accordance with one embodiment of the present disclosure is shown in FIG. 1 and designated 100. The random number generator system 100 in the illustrated embodiment includes a quantum noise source 110, a local oscillator 120, a combiner 130, and a detector 140.

In the illustrated embodiment, conjugate homodyne detection is achieved and has been verified experimentally to provide photon statistics of a single mode component (selected by the local oscillator 120) of the ASE source that follow Bose-Einstein distribution, as expected from a single mode thermal state.

In one embodiment, to facilitate the estimation of the photon number per mode arrived at the detector 140 (e.g., an optical homodyne detector) and reduce the power of unused light, a 0.8 nm optical bandpass filter centered at 1542 nm (e.g., bandpass filter 114) may be placed after the ASE source. A laser source with a central wavelength of 1542 nm (Clarity-NLL-1542-HP from Wavelength Reference) may be employed as the local oscillator 120. Note that, in one embodiment, it is not necessary to stabilize the laser frequency since the laser frequency does not drift out of the 0.8 nm range under normal operation. In one embodiment, optionally, to prevent the saturation of photodetectors of the detector 140, an optical attenuator 122 may be applied to reduce the LO 120 power to about 4 mW.

In the illustrated embodiment, the outputs from the quantum noise source 110 (e.g,. the ASE source) and the LO 120 (e.g., a laser) beat at the beam combiner 130 (e.g,. a 50:50 fiber beam splitter) and the differential interference signal is measured by the detector 140 (e.g., a 350 MHz balanced photo-receiver [such as the one available from Thorlabs]). Although the output of the ASE source is unpolarized in the illustrated embodiment, the LO 120 may automatically pick out the same polarization mode as itself. As a result, in one embodiment, no polarization control is required for effective operation. The overall efficiency η of the detection system, including coupling losses and insertion losses of optical components and the quantum efficiency of photodiodes, has been determined to be 0.5. An analog-to-digital converter (ADC) 146 may be used to sample the output of the balanced receiver. In one embodiment, all of the optical components are single mode fiber pigtailed.

The RNG 100 in the illustrated embodiment in FIG. 1 enables measurement of a randomly chosen (due to random phase relation between the LO laser and the ASE source) quadrature of a single mode thermal state. The output is considered to be truly random following a Gaussian distribution with a zero mean and a variance of 2n+1 in the shot-noise unit, where n is the average photon number of the ASE source in the mode determined by the LO 120.

To calibrate the average photon number n, an optical power meter may be used to measure the output power P of the ASE source after the optical filter. Using the relation of v=c/λ, we can determine the total mode number N corresponding to a bandwidth of Δλ and a time window of Δt=1 s as:

$$N = 2\Delta v \Delta t = \frac{2c\Delta\lambda}{\lambda^2}, \quad (2)$$

where λ(v) is the central wavelength (frequency) of the filtered ASE light and c is the speed of light in vacuum. The factor 2 is due to the two polarization modes generated by the ASE source. The effective average photon number n (after taking the detection efficiency of the optical homodyne detector into account) can be determined from the optical power P using:

$$n = \frac{\eta P}{N h v} = \frac{\eta P \lambda^3}{2hc^2 \Delta\lambda}, \quad (3)$$

where h is the Planck constant. Experimentally, P has been measured to be 29.0 µW. Given η=0.5, Δλ=0.8 nm, and λ=1542 nm, the average photon number n has been determined to be about 555 per mode. As a result, the expected quadrature variance of this source is considered to be about three orders of magnitude larger than vacuum noise.

In one embodiment of the RNG 100, both the incoherent source and the LO 120 are operated in a CW mode; no active modulation or phase (or polarization) stabilization is required. This construction may enable chip-size integration.

I. Quantum Noise Source

The quantum noise source 110 may be configured to generate a thermal state input 112. In one embodiment, the quantum noise source 110 may be include a substantially incoherent source 111, such as a substantially incoherent broadband source with broadband ASE. As an example, the substantially incoherent broadband source 111 may include a fiber amplifier (e.g., from PriTel, Inc.) with a vacuum state input. The ASE noise generated by such a fiber amplifier is considered thermal.

For purposes of disclosure, coherent and incoherent is defined based on the second-order correlation function g^(2)(t), which describes intensity correlation. In this definition, a laser, with a g^2(0)=1, is considered a good coherent source; while a light bulb, with a g^2(0)=2, is considered a good incoherent source. Note this is different from the "classical" coherence based on first-order correlation (first-order coherence). For example, if the light from a light bulb is sent through a narrow bandpass filter, its first-order coherence can be increased. However, the second-order correlation function g^2(0) is still 2, so the combination of the light bulb and the narrow band filter is still considered an incoherent source.

Theoretically, there is no direct relation between the bandwidth of a source and its second-order coherency. As discussed above, the filtered light from a light bulb is still considered incoherent. In practice, an incoherent source, for example, a superluminescent Diode (SLD) most often has a larger bandwidth. In one embodiment of the present disclosure, the bandwidth of the incoherent source and the bandpass filter are not significantly important. As discussed herein, a strong LO (which is generated by a laser in one embodiment) may only interfere with light in the same spectral bandwidth as itself. Light from the incoherent source outside the above spectrum may be wasted.

The quantum noise source 110 in one embodiment may include a bandpass filter 114. The bandpass filter 114 may be utilized in one embodiment for at least two reasons: (1) the light after the bandpass filter 114 may have a well determined bandwidth, which aids in calculating the "mode" numbers of the filtered light for quantitative study; and (2) the bandpass filter 114 may significantly attenuate or block most of the unused light from the incoherent source to prevent the saturation of photodiodes in the detector 140.

In one embodiment, the bandwidth of a substantially incoherent source (used as the quantum noise source 110) is about 50 nm, with an irregular distribution. The bandpass filter 114 may be applied to the output of the incoherent source, increasing the probability that the filtered light has a well-defined bandwidth and distribution. This may enable comparison of experimental results with theoretical analysis. In one embodiment, for random number generation, the bandpass filter 114 may have little impact and can be removed (as long as aspects of the detector 140, such as one or more photodiodes, are not saturated by unused light from the incoherent source).

In one embodiment, the bandwidth of the incoherent source is about 50 nm (in the order of 10 THz), the bandwidth of the bandpass filter 114 is about 0.8 nm (about 100 GHz), the equivalent bandwidth of the detector 140 in the form of a balanced photoreceiver is about 350 MHz, and the bandwidth of the local oscillator 120 is about 100 KHz.

In this configuration, in general, about 1% (100 GHz vs. 10 THz) of light from the incoherent source may pass the bandpass filter 114; about 0.35% (350 MHz vs. 100 HGz) of the filtered light may be detected and contribute to random number generation. Most of the light from the incoherent source is simply wasted or blocked.

It is noted that, in one embodiment, Wavelength-division multiplexing (WDM) may be utilized to divide the output of an incoherent source into many narrowband lights, and distribute them to a plurality of detectors 140, such that each of the plurality of detectors 140 can generate independent random numbers simultaneously based on the same incoherent source. In this embodiment, each detector 140 may operate in conjunction with its own local oscillator 120.

Many practical (thus cost-effective) incoherent sources are broadband, and for this reason, the quantum noise source 110 in one embodiment is a broadband incoherent source. However, it should be noted that, in principle, a narrowband incoherent source may be prepared, and its output may be utilized in conjunction with the local oscillator 120 in one embodiment. As indicated herein, the bandpass filter 114 is optional and may be absent from commercial implementations.

In one embodiment, it is noted that the broadband nature of the incoherent source may provide a practical advantage: The wavelength of the LO 120 may not need to be substantially stabilized to be within the spectrum of the incoherent source. For instance, if the incoherent source is extremely narrowband, then the wavelength of the LO 120 may need to be adjusted to ensure the wavelength overlaps with that of the incoherent source. If this is the case, wavelength stabilization technology may be applied on both sources to ensure their wavelengths are always locked. With a broadband incoherent source, instead of a narrowband incoherent source, such wavelength stabilization technology is considered unnecessary.

It should be noted that, as discussed herein, the bandpass filter 114 of the quantum noise source 110, is optional. Whether the bandpass filter 114 is present may have little impact on the random number generated from the RNG 100. In one embodiment, the randomness comes from both the phase and amplitude fluctuations of the thermal state input 112 generated from the quantum noise source 110.

The quantum noise source 110 in one embodiment is an incoherent source, as mentioned above. The incoherent source may be a multi-mode thermal state source that, as discussed herein, may function as a single-mode thermal state source by superposition with the output from the local oscillator 120. The single mode in this context may be determined by the LO 120 and the bandwidth of the detector 140 in the form of a balanced photoreceiver. For instance, in general, only light with frequency closest to that of the LO 120 (and within the bandwidth of the balanced photoreceiver) are in the same mode as the LO 120 and can be detected by the detector 140. In one embodiment, the bandwidth of a balanced detector is about 350 MHz, the bandwidth of the incoherent source is about 10 THz, and the bandwidth of the filtered light is about 100 GHz. Both the output of the incoherent source, and the filtered light passing through the bandpass filter 114 are multi-mode thermal state.

II. Local Oscillator

The local oscillator 120 or LO 120 in the illustrated embodiment is configured to as a single mode source or to provide a single mode input to the combiner 130. In the illustrated embodiment, the local oscillator 120 is based on output from a light source directed through single mode optical fiber. The single mode optical fiber may automatically achieve single mode with respect to light passing through the fiber. In other words, the output from the single mode optical fiber may be a single "spatial" mode or single spectrotemporal mode. With this arrangement, the bandwidth of the output of the local oscillator 120, provided as a single mode input, may be sufficiently narrow.

In one embodiment, the output from the local oscillator may be a plane wave in the electromagnetic spectrum with constant or near constant wavelength, polarization, and phase.

III. Beam Combiner

In the illustrated embodiment, the outputs from the quantum noise source 110 and the local oscillator 120 are provided respectively as a thermal state input and a substantially single mode input to the combiner 130, also described herein as the beam combiner 130. The beam combiner 130 may be a type of signal combiner capable of generating a combined signal based on the thermal state input and the substantially single mode input.

In one embodiment, the beam combiner 130 may be a beam splitter operable to combine the thermal state input and the substantially single mode input to generate a combined output, which can be described in one embodiment as a combined beam.

The beam combiner 130 may operate by the principle of superposition to generate the combined output. Fluctuations in the combined output may originate from both phase and amplitude fluctuation of the thermal state input 112 of the quantum noise source 110. In one embodiment, the beam combiner 130 may be operable to facilitate interference between the thermal state input and the substantially single mode input, with an observed intensity fluctuation in the combined output resulting from both quantum phase and quantum amplitude noise of the quantum noise source. It is noted that if the noise were from the quantum phase noise alone, a histogram of the observed quantum noise is unlikely to be Gaussian.

In the illustrated embodiment, the quantum noise source 110 and the local oscillator 120 may operate in continuous wave (CW) mode. For instance, in contrast to a "pulsed" mode, both light sources may output light continuously. In the continuous wave mode, in one embodiment, the thermal state input and the substantially single mode input may include a significant number of photons for a given period.

The thermal state input, as discussed herein, may be a multi-mode thermal state. By interference with the substantially single mode coherent state input via the beam combiner 130, the quadrature of one selected mode of the thermal state input can be determined. One way of conceptualizing the combined output is that the local oscillator 120 automatically picks out a single mode thermal state from the multi-mode thermal state of the quantum noise source 110 that matches the mode of the local oscillator 120. As discussed herein, the detector 140 may measure a quadrature of this single mode thermal state, which can be interpreted as a measurement of the electric field of the single mode thermal state.

The combined outputs from the beam combiner 130 may represent the quadrature value of a single mode thermal state having quadrature variations or fluctuations that can be observed and quantified as quantum noise for purposes of generating randomness. In classical electromagnetics, an arbitrary electrical field can be written in the form of Ex cos (2*pi*ft)+Ep sin(2*pi*ft). In quantum optics, Ex and Ep correspond to two quadratures of a quantum state, and can be measured by using optical homodyne detection (as discussed herein). In one embodiment, homodyne detection means the strong output from the LO 120 plus the beam combiner 130 and a balanced photoreceiver as the detector 140. This embodiment may be configured to measure a quadrature of the substantially single mode thermal state. By repeating the measurement many times, the variance of the measured data can be determined. The measurements may be indicative of the quadrature variance of the substantially single mode thermal input state.

It is noted that quadrature variance of the substantially single mode thermal state generated in accordance with one embodiment is significantly larger than the vacuum state. Like a light bulb can be bright or dark, a thermal state can have a large (average) photon number or small photon number. The homodyne detection described in accordance with one embodiment may be operable to measure the quadrature of the substantially single mode thermal state, regardless its average photon number. It is noted that, the substantially single mode thermal state refers to the overall quantum state of all the photons it contains. For many light sources used in one or more embodiments, such as a laser, or a thermal source, the photon number is not well defined. For this reason, the photon number is described as being an "average" photon number.

IV. Detector

In the illustrated embodiment, the combined output from the beam combiner 130 is provided to the detector 140, which may be configured to extract the quadrature of the single mode thermal state input as quantum noise of the single mode thermal state input and to generate randomness therefrom. The detector 140 may be configured to generate an electrical signal indicative 148 of the quantum noise in the thermal state input.

The electrical signal indicative of quantum noise may be an analog signal, which can be sampled by the detector 140 to generate bits of randomness. The detector 140 may include an analog-to-digital converter (ADC) 146 that samples the analog signal representative of quantum noise.

The detector 140 in the illustrated embodiment includes a plurality of photodetectors 142 that respectively sense the combined output of the beam combiner 130. For instance, the detector 140 may include a first photodetector 142A and a second photodetector 142B configured to generate respectively first and second electrical signals representative of an intensity level (e.g., light intensity) of the combined output.

The electrical output of each photodetector 142 may have a very large DC background (e.g., a constant voltage). Within this electrical output is a very small fluctuation representing the quantum noise from the thermal state input 112 of the quantum noise source 110. To remove the strong DC background and measure the small quantum noise, the outputs of the first and second photodiodes 142A-B may be provided to an electrical differential amplifier 144. The strong DC background at least in part is the result of the local oscillator 120 being much stronger or more intense than the quantum noise source 110 (e.g., the incoherent source). The DC background may correspond approximately to half the power of the local oscillator. By using balanced detection, the strong DC background can be canceled out, enabling effective detection of the relative small quantum noise.

The strong DC background (which is considered to be substantially the same for the two outputs of the first and second photodetectors 142A-B) can be canceled out with the electrical differential amplifier 144, leaving the quantum noises measured by the first and second photodetectors 142A-B. This configuration with first and second photodetectors 142A-B and the electrical differential amplifier 144 is described as a balanced photoreceiver. The analog output of the electrical differential amplifier can be used directly in one or more applications as a truly random source; or as discussed herein, the analog output can be digitized with the ADC 146.

Data post-processing can be applied to digitized output of the ADC 146 in one embodiment to generate random numbers in a target format (for example, binary random numbers).

Vacuum noise is considered very small. As a result, to detect vacuum noise, a balanced photoreciever may be constructed such that the noise of a balanced photoreceiver itself (including noises from photodiodes, electrical amplifier and other electrical components) is very small. This construction, however, is unlikely to be fast; there is a tradeoff between fast detection and very low noise in detecting vacuum noise with a balanced photoreceiver.

One embodiment according to the present disclosure is configured to utilize a thermal state input (e.g., an output from a broadband incoherent source) rather than a vacuum noise input. The thermal state input is more "noiser" than the vacuum state, and therefore can be detected more easily. The noise variance of the single mode thermal state with an average photon number of n is 2n+1 times as large as that of vacuum noise. So, by using a bright thermal state, the inherent noise of a balanced photoreceiver can be negligible as compared with the noise of the thermal state, thereby enabling fast detection with respect to quantum noise generated from the quantum noise source 110. As discussed above, to generate the thermal state input, an ASE source, such as a Superluminescent Diode, or a Light Emitting Diode (LED) can be used. This configuration may yield a low-cost and high random number generation rate system that can be integrated into a chip or ASIC.

It is noted that the analog output from the electrical differential amplifier 144 of the balanced photoreceiver may be proportional to a component of the electrical field of the thermal state input 112 to the beam combiner 130. The quantum noise in this electrical field can be realized from both phase and amplitude fluctuations of the electrical field. This is in contrast to a QRNG based on phase noise alone.

The detector 140 includes any and all electrical circuitry and components to carry out the functions and algorithms described herein. Generally speaking, the detector 140 may include one or more microcontrollers, microprocessors, and/or other programmable electronics that are programmed to carry out the functions described herein. The detector 140 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the detector 140, or they may reside in a common location within the detector 140. When physically distributed, the components may communicate using any suitable serial or parallel communication protocol, such as, but not limited to, CAN, LIN, FireWire, I2C, RS-232, RS-485, and Universal Serial Bus (USB).

V. ASE Configuration

An RNG 100 in accordance with one embodiment using an ASE source as the quantum noise source 110 is provided. The RNG 100 in this embodiment may include an ADC 146 configured as a 12-bit data acquisition board (e.g., from Texas Instruments) to sample the electrical signal output of the electrical differential amplifier 144. The maximum sampling rate is mainly limited by the electrical differential amplifier 144: if the sampling rate is close to or above the detector bandwidth, adjacent samples may show significant correlation. Given the detector bandwidth is 350 MHz, a sampling rate of 100 MHz can be utilized to yield effective results. Limited by the memory size of the data acquisition board, $10^5$ samples have been collected in this RNG 100. The histogram of the raw data together with a Gaussian fit curve is shown in FIG. 2.

Figure 2:
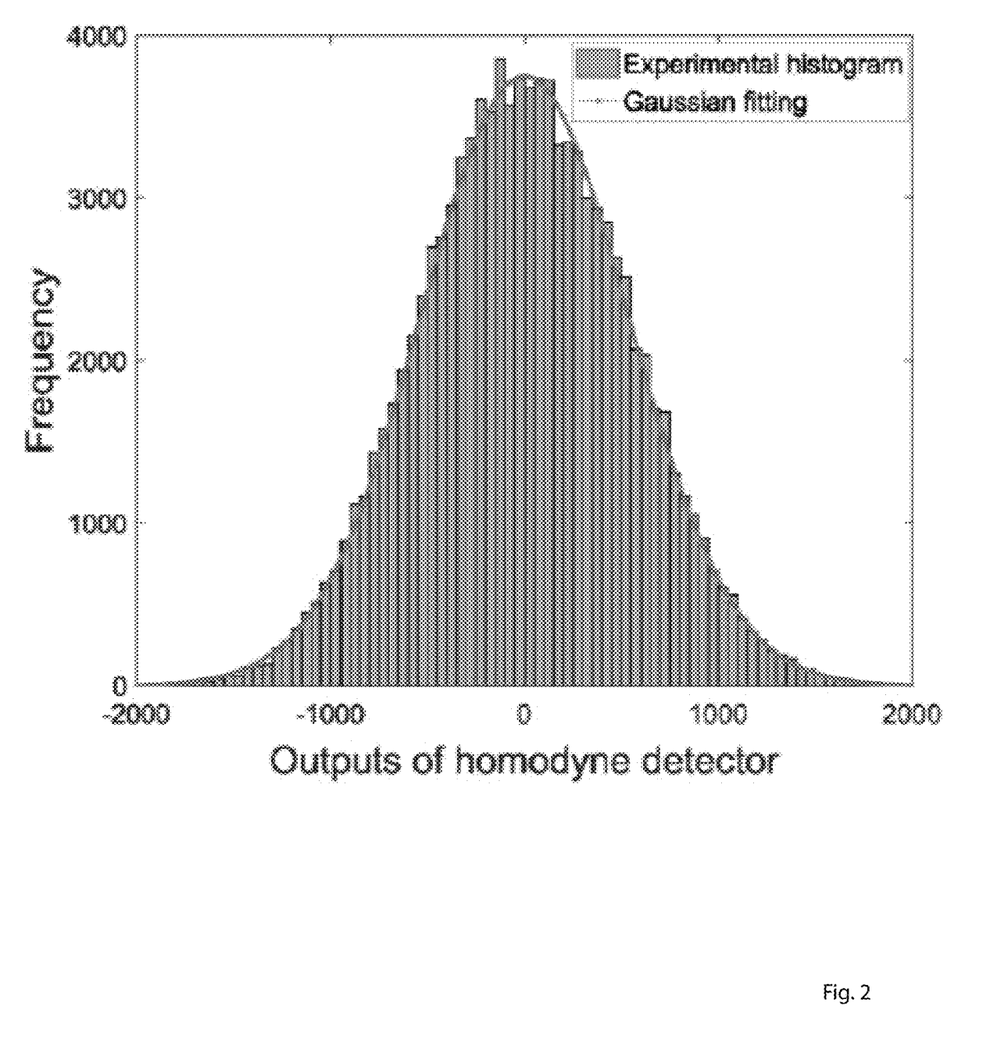
FIG. 2 shows a histogram of data output from the random number generator in one embodiment.

In other words, a histogram of output from the detector 140 configured as a homodyne detector with balanced photodetection according to one embodiment is depicted in the illustrated embodiment of FIG. 2. As can be seen, X-axis values corresponding to the analog output of the electrical differential amplifier 146 are in the range of −2000 to 2000 centered about 0. The Y-axis corresponds to the number of measurements made with respect to a subset of X-axis values. The histogram shows a Gaussian distribution of the random numbers generated by the RNG 100. For instance, most of the measurement results are close to zero. This means the intensity levels received by the first and second photodetectors 142A-B are almost the same, so the differential signal is about zero.

The raw data fit a Gaussian distribution reasonably well. The deviation from a perfect Gaussian distribution can be attributed to the systematic errors of the data acquisition board, including its nonlinearity. To further justify the Gaussian assumption, a chi-square test for goodness of fit using 1000 samples from the above raw data can be performed. The chi-square test in one embodiment yields an α value of 0.35, indicating that there is no good reason to reject the Gaussian fit.

Figure 3A:
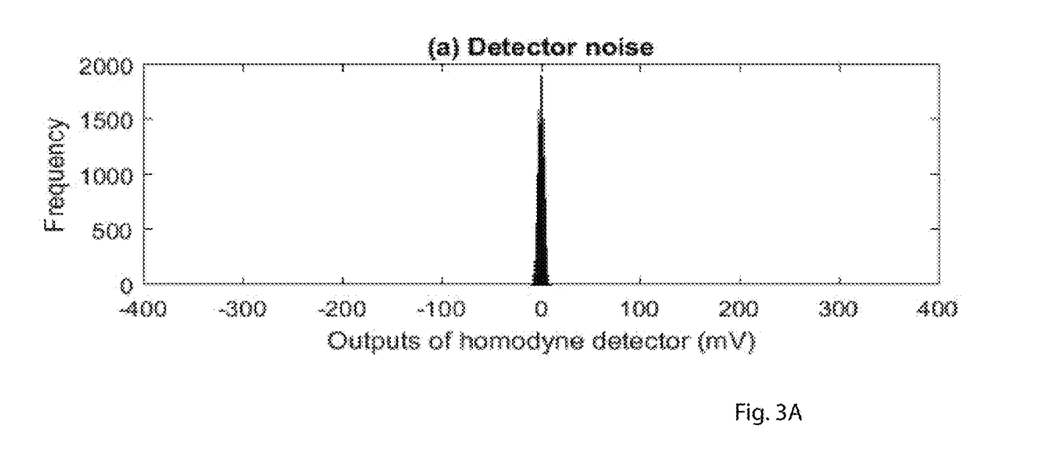
FIG. 3A shows detector noise of the random number generator in one embodiment.
Figure 3B:
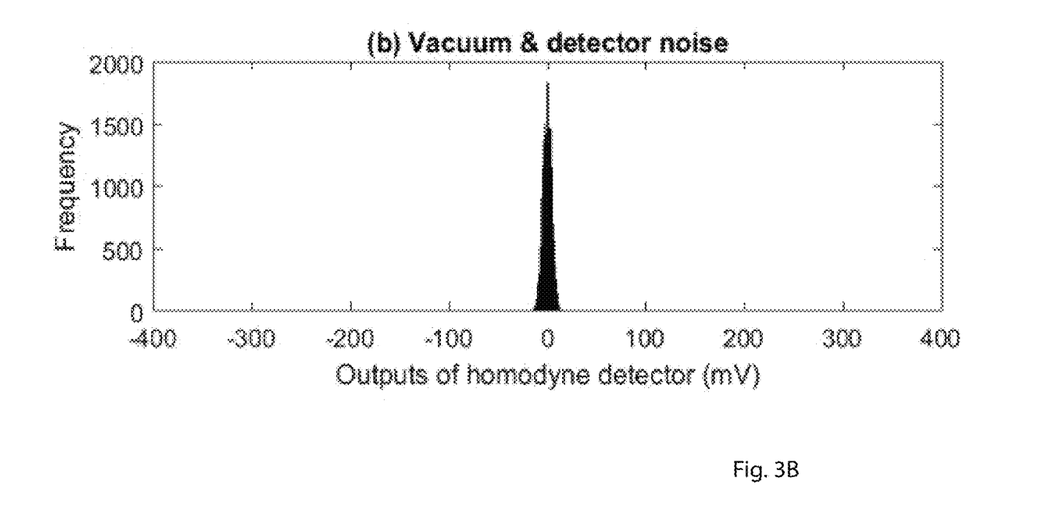
FIG. 3B shows vacuum and detector noise of the random number generator in one embodiment.

To determine the variance of the samples in the shot-noise unit, the detector noise can be measured (by turning off both the ASE source and the LO) and the vacuum noise (by turning on the LO only) separately. The measurement results for the RNG 100 in one embodiment with this configuration are shown in FIGS. 3A and 3B. Comparing FIG. 2 with FIG. 3, the quantum noise from the substantially single mode thermal state is much larger than both the vacuum noise and the detector noise. As a result, the RNG 100 can be configured as a low-cost, noisy detector that operates effectively. By comparing the data in FIG. 3A with that in FIG. 3B, the detector noise in one embodiment can be been determined to be 0.62 in the shot-noise limit. After being normalized to the vacuum noise, the variance of the Gaussian random numbers shown in FIG. 2 can be determined to be 963 in the shot-noise unit, corresponding to a single mode thermal state with an average photon number of 481. Note that this average photon number is about 13% smaller than the value estimated from optical power P using equation (3). This discrepancy is considered to be the result of the errors in determining the bandwidth of the optical filter and the efficiency of the detector.

Figure 4:
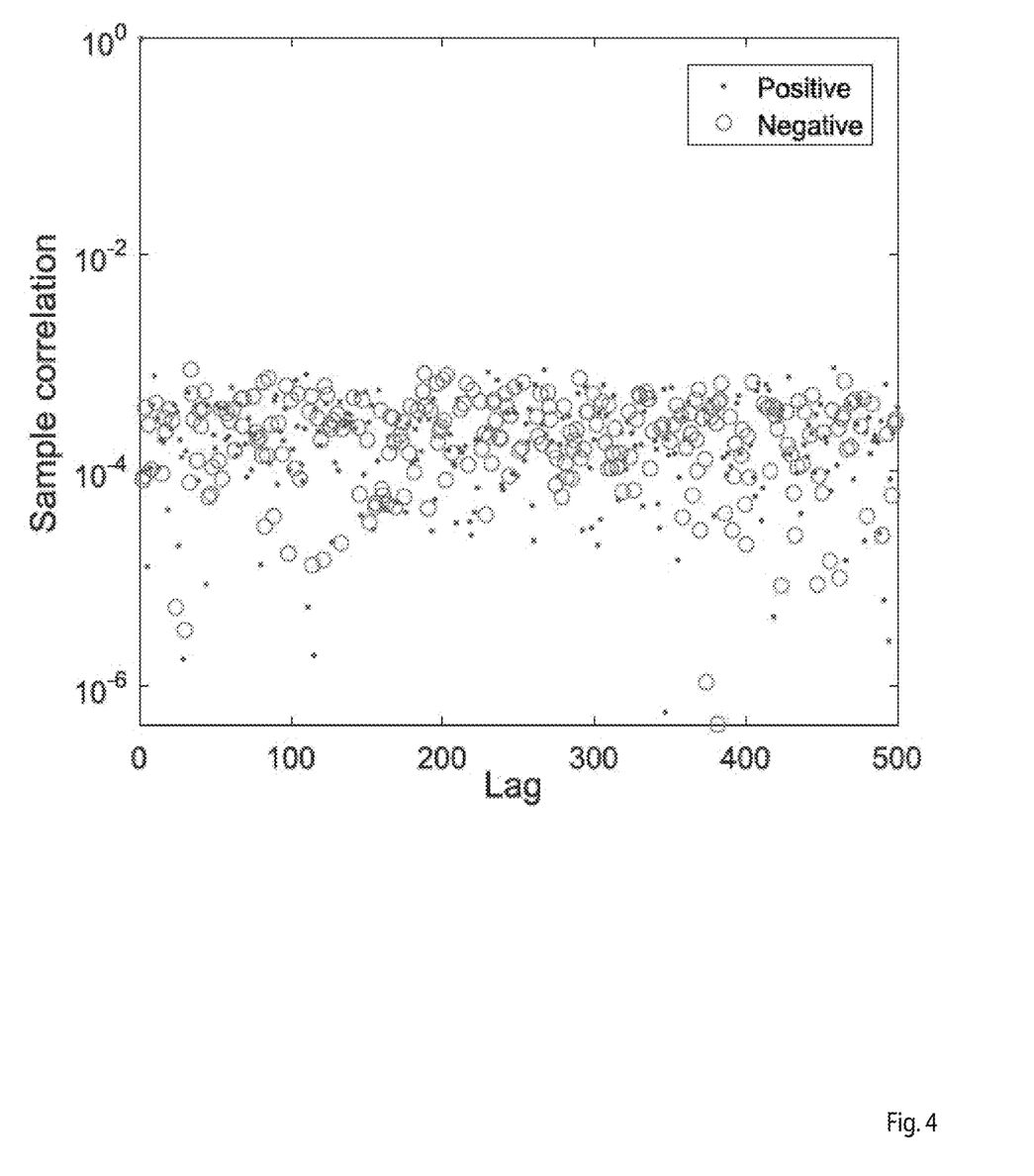
FIG. 4 shows sample correlation of the output of the random number generator in one embodiment.

An RNG 100 in one embodiment is configured with the electrical signal output from the differential amplifier 144 to an ADC 146 in the form of an 8-bit oscilloscope (e.g., from Agilent) to acquire $10^7$ samples at a sampling rate of 100 MHz. The autocorrelation of the collected data is shown in FIG. 4. The correlation coefficients for lags larger than zero are below $10^{-3}$ and within the range of the statistical uncertainty due to the finite sample size. This highlights the high quality of the entropy source.

In other words, the illustrated embodiment of FIG. 4 depicts sample correlation for one embodiment of the RNG 100. It noted that an ideal random number generator is defined as having is no correlation between samples: given 1, 2, 3 . . . n−1 outputs of the QRNG, no prediction can be made with respect to the value of the nth output. In other words, the correlation between samples is zero. In practice, only a finite number of samples can be collected. As a result, with a finite number of samples, there is a small deviation from zero due to statistical fluctuation. The illustrated embodiment of FIG. 4 shows the sample correlation of one embodiment of the RNG 100 being very small. The deviation from zero is within the statistical fluctuation of the data size. In other words, from the aspect of sample independence, the illustrated embodiment shows no observed difference between one embodiment of the RNG 100 and an ideal QRNG.

VI. Gaussian Distribution and Uniform Distributions

While the above Gaussian distributed raw data is useful in certain applications, uniformly distributed random bits are more common commercially. The Gaussian output of the detector 140 in one embodiment may be transformed to yield such a uniform distribution of random bits. In one embodiment, the Gaussian raw data may be applied to a voltage comparator, which is essentially a 1-bit ADC. By balancing the efficiencies of the two photodiodes 142A-B of the detector 140 and selection of a suitable threshold voltage, one random bit can be generated from each raw sample. To enhance the random number generation rate, multi-bit ADC can be employed.

In one embodiment of the RNG 100, the ADC 146, such as the internal 8-bit ADC of the oscilloscope, can be used to sample the output of the homodyne detector. The ADC 146 may operate in conjunction with binning circuitry that may convert an analog input (from the differential amplifier 144) into one of the 256 ($2^8$) output bins. The widths of the 256 bins may be tailored so that the Gaussian distributed analog input results in a digital output uniformly distributed among the 256 bins. In one embodiment of this approach, 8 random bits may be generated per detection.

In one embodiment of the RNG, the ADC 146 may have an equal bin size, such that the digital outputs (raw samples) are not uniformly distributed. A Toeplitz-hashing extractor may be provided to generate binary random bits from the raw samples (e.g., 8-bit raw samples) to yield a substantially uniform distribution of random bits.

For instance, the 8-bit output of the ADC can be represented as as random variable X. The maximum number of random bits that can be extracted from each 8-bit raw sample is lower bounded by the minimum-entropy of X, which is defined as:

$$H_{min} = -\log_2(P_{max}),\qquad(4)$$

where $P_{max} = \max_{x \in \{0,1\}^8} \Pr[X=x]$ quantifies the maximal probability that X is one of the $2^8$ binary sequences. Using equation (4), the minimum-entropy of the raw data can be determined as $H_{min}$=6.4. In the asymptotic case, an average 6.4 random bits can be generated from each 8-bit raw sample, corresponding to an efficiency of 0.8 bits per raw bit. If the untrusted technical noise of the system makes a significant contribution to the output, conditional minimum-entropy may be employed to estimate the extractable randomness.

In one embodiment, the Toeplitz-hashing extractor may be applied to generate nearly perfect random bits from the raw data of the detector 140. The Toeplitz-hashing extractor may extract an m-bit random sequence by multiplying an n-bit raw sequence with an n-by-m Toeplitz matrix. The Toeplitz matrix may be constructed from a long (n+m−1 bits) but a reusable random seed. For instance, m=256 and n=400 may be selected with an efficiency of 0.64 bits per raw bit (or 5.12 bits per raw sample). According to the leftover hash lemma, the security parameter ε of the randomness extractor can be determined by:

$$m = n\frac{H_{min}}{8} - 2\log_2\left(\frac{1}{\varepsilon}\right).\qquad(5)$$

Figure 5:
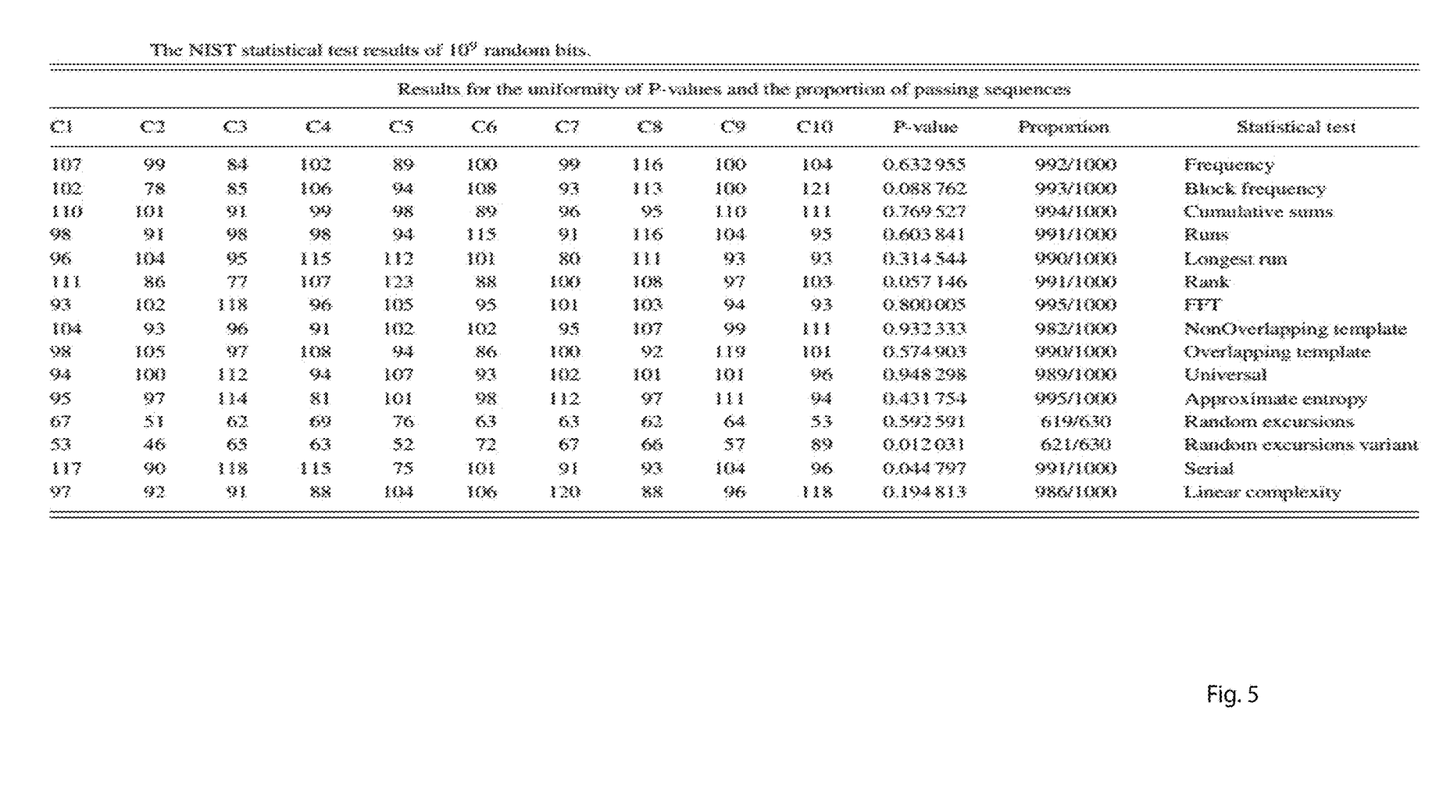
FIG. 5 depicts a comparison of the random number generator in one embodiment against standardized test criteria.

Using n=400, m=256, and $H_{min}$=6.4, the security parameter can be determined to be $\varepsilon=2^{-32}$, which means the statistical distance between the extracted random sequence and the perfect random sequence is bounded by $\varepsilon=2^{-32}$. To evaluate the quality of the random bits generated from the randomness extractor, 1 Gb random numbers can be generated and fed into a standard NIST statistical test suite. As summarized in FIG. 5, the random number generator 100 in one embodiment with the Toeplitz-hashing extractor passes all the 15 NIST tests.

In one embodiment, the sampling rate may be limited by the bandwidth of the detector 140. For instance, in one configuration, 100 mega samples per second may be the maximum sample rate. Combined with a hashing efficiency of 5.12 bits per raw sample, the equivalent random number generation rate in this configuration is 512 Mbps. To further increase the rate, the bandwidth of the detector 140 may be increased. For example, using a 15 GHz detector, the sampling rate can reach 10 Giga samples per second (GSps). The corresponding random number generation rate can be 51.2 Gbps.

It is noted that, in practice, a faster detector may have a higher electrical noise that may reduce the quantum noise-to-electrical noise ratio. The achievable rate for each configuration may be evaluated based on actual characteristics of the random number generator 100.

In one embodiment, given a noiseless detector capable of resolving the photon number of the input state and an ADC with arbitrarily high precision, then an alternative to performing homodyne detection may include measuring the photon number of the thermal state directly. The photon number distribution of a thermal state is given by:

$$P(n) = \frac{\langle n \rangle^n}{(1+\langle n \rangle)^{1+n}},\qquad(6)$$

where $\langle n \rangle$ is the average photon number per sampling time window. The maximum probability in this configuration is $P_{max}=P(0)=1/(1+\langle n \rangle)$. From (4), the minimum-entropy of the source is $H_{min}=\log_2(1+\langle n \rangle)$. For example, if the output power of the thermal source is 1 mW (at 1550 nm) and the sampling rate is 10 GSps, then the average photon number within the sampling window (100 ps) is about $7.8\times10^5$. In this configuration, the RNG 100 may generate 19.6 random bits per sample.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A random number generator (RNG) operable to generate one or more random bits of data, said RNG comprising:
 a quantum noise source configured to generate a thermal state input;

a local oscillator configured to generate a substantially coherent state input;

a combiner operably coupled to said quantum noise source and said local oscillator to respectively receive said thermal state input and said substantially coherent state input, said combiner configured to generate a combined output based on superposition of said thermal state input and said substantially coherent state input; and a detector operable to receive said combined output from said combiner, said detector configured to generate an electrical signal indicative of quantum noise of said thermal state input.

2. The RNG of claim 1 wherein said detector includes first and second photo detectors, wherein said first photo detector is operable to generate a first electrical signal representing a light intensity of a first combined output corresponding to said combined output, and wherein said second photo detector is operable to generate a second electrical signal representing a light intensity of a second combined output corresponding to said combined output.

3. The RNG of claim 2 wherein a difference between said first and second electrical signals forms said electrical signal indicative of the quantum noise of said thermal state input.

4. The RNG of claim 3 wherein said first and second photo detectors form a balanced photo receiver, wherein said first electrical signal and said second electrical signal include a background signal superimposed with a quantum noise signal of said thermal state input.

5. The RNG of claim 4 wherein said quantum noise signal of said thermal state input is extracted as a difference between said first and second electrical signals.

6. The RNG of claim 1 wherein said electrical signal is sampled to generate the one or more random bits of data.

7. The RNG of claim 1 wherein said substantially coherent state input is a single mode laser beam with a single spatial temporal mode.

8. The RNG of claim 1 wherein said quantum noise source is a substantially incoherent light source configured to generate light that forms said thermal state input.

9. The RNG of claim 8 wherein said thermal state input has a significantly greater quadrature noise variance than vacuum noise.

10. The RNG of claim 2 wherein a difference between said first and second combined outputs reflects a quadrature of one mode of said thermal state input.

11. A method of generating one or more random bits of data, said method comprising:

transmitting a thermal state input having quantum noise;

transmitting a substantially coherent state input having a narrow spectral bandwidth;

combining the thermal state input with the substantially coherent state input via superposition to generate first and second optical outputs; and generating an electrical signal indicative of the intensity difference of the first and second optical outputs.

12. The method of claim 11 wherein said generating includes:

detecting the first and second optical outputs in first and second photo detectors;

generating a first electrical signal representative of light intensity of the first optical output;

generating a second electrical signal representative of light intensity of the second optical output; and differencing the first and second electrical signals to yield the electrical signal, wherein the intensity difference indicated by the electrical signal is representative of the quantum noise in one selected mode of the thermal state input.

13. The method of claim 12 comprising sampling the electrical signal at a frequency to yield a plurality of samples indicative of the quantum noise, wherein sampling the electrical signal extracts the quantum noise in one selected mode of the thermal state input.

14. The method of claim 12 wherein a quantum noise variance of the selected mode of the thermal state input for a given number of photons can be substantially greater than the variance of vacuum noise.

15. The method of claim 11 wherein said transmitting the thermal state input includes energizing a spontaneous emission source to emit a plurality of photons.

16. The method of claim 11 wherein the thermal state input is a multi-mode thermal state input, and wherein combining the multi-mode thermal state input with the substantially single mode coherent state input generates outputs from one selected mode of the multi-mode thermal state input with the selected mode substantially the same as the substantially coherent state input.

17. A quantum random number generator (QRNG) comprising:

a thermal state generator configured to generate a multi-mode thermal state input; and a detector operably coupled to said thermal state generator, said detector configured to transform said multi-mode thermal state input to a single-mode thermal state input, said detector configured to generate an electrical signal based on an electric field component of said single-mode thermal state input, wherein said electrical signal is indicative of quantum noise in said single-mode thermal state input.

18. The QRNG of claim 17 comprising a conversion circuit configured to convert said electrical signal to a plurality of digital values by sampling said electrical signal at a sampling frequency, wherein said plurality of digital values form randomness generated from said QRNG.

19. The QRNG of claim 17 wherein said detector is a first detector, and comprising a second detector configured substantially the same as said first detector, wherein said first and second detectors are coupled to said thermal state generator, and wherein said first and second detectors are operable to generate first and second streams of random bits.

20. The QRNG of claim 17 wherein said detector is a homodyne detector.

* * * * *